UNITED STATES PATENT OFFICE 2,622,073

PROCESS OF PREPARING ALKANOLAMINES

Paul Ferrero, Tertre, and François Berbé and Léon René Flamme, St. Ghislain, Belgium, assignors to Societe Carbochimique, Societe Anonyme, Brussels, Belgium, a company of Belgium Application June 26, 1947, Serial No. 757,318
In Belgium March 21, 1947

6 Claims. (Cl. 260—584)

This invention relates to the preparation of alkanolamines. The reactions between olefine oxides and ammonia in aqueous solution lead to the formation of mixtures of primary, secondary and tertiary amines. It is known that the composition of the mixtures of these amines depends upon the relative proportions of the reactants—olefine oxide and ammonia—employed.

It is known further that the preparation of primary amines, practically with the absence of secondary and tertiary amines, may only be carried out by using a considerable excess of ammonia in relation to the olefine oxide, which excess may be as much as 50 moles of ammonia to 1 mole of oxide. The reaction carried out under these conditions at atmospheric pressure, with ammoniacal solutions of a density between, for example, 0.91 and 0.93 at 15° C., leads to such dilutions of the amines in the final solution that certain producers have had to resort to special means for reducing the calorific expenditure necessary for obtaining amines in the anhydrous state.

It is also known that the quantity of primary amines obtained for a given excess of ammonia may, to a certain extent, be increased by operating in the presence of volatile mineral acids leading to amine salts which must then be decomposed. On the other hand, the employment of slight ammoniacal excesses leads, as is known, to the formation of tertiary amines in the presence of small quantities of primary and secondary amines. A certain excess of alkali is actually essential if it is desired to avoid the formation of by-products by reaction of olefine oxide on the tertiary amines.

In the presence of an excess of ammonia between that directing the reaction towards the monoalkanolamines and that directing it towards the tri-alkanolamines, there is obtained, with acceptable concentrations of between 100 to 200 grams per litre, a mixture of amines in which the proportion of di-alkanolamines becomes considerable.

The reaction of ethylene oxide on ammonia for example develops according to the following mechanism:

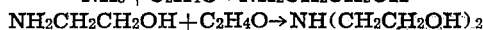
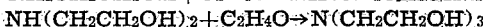
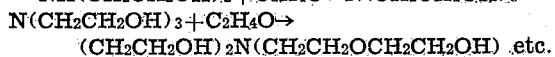

that is to say, a succession of multistage reactions of oxyethylation of the ammonia, to form the mono-, di- and tri-ethanolamines.

Figure 1:
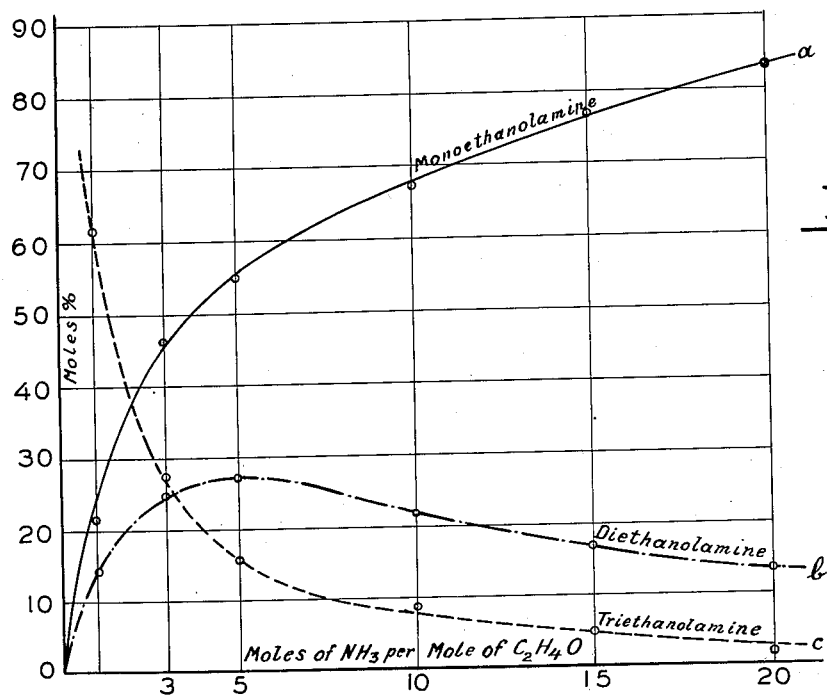

We have established that the percentage at equilibrium of the three amines: mono-, di- and tri-ethanolamine, is a function of the ammonia oxide molecular ratio being employed; the curves of Figure 1 of the accompanying drawing represent these results expressed in mole percent at a temperature of 15° C.

For an ammonia/oxide molecular ratio of 5:1, for example, there is obtained, with a concentration of about 11%, an amine mixture having a molar composition of 57% mono-, 28% di- and 15% tri-ethanolamine, or, by weight, 40% mono-, 34% di- and 26% tri-ethanolamine.

Of the three amines under consideration, the greatest demand is for the mono- and the tri-ethanolamine; consequently, it is interesting to try to reduce, and even to suppress, the formation of di-ethanolamine or, more broadly, the secondary amine, and it is this which is the object of the present invention.

Figure 2:
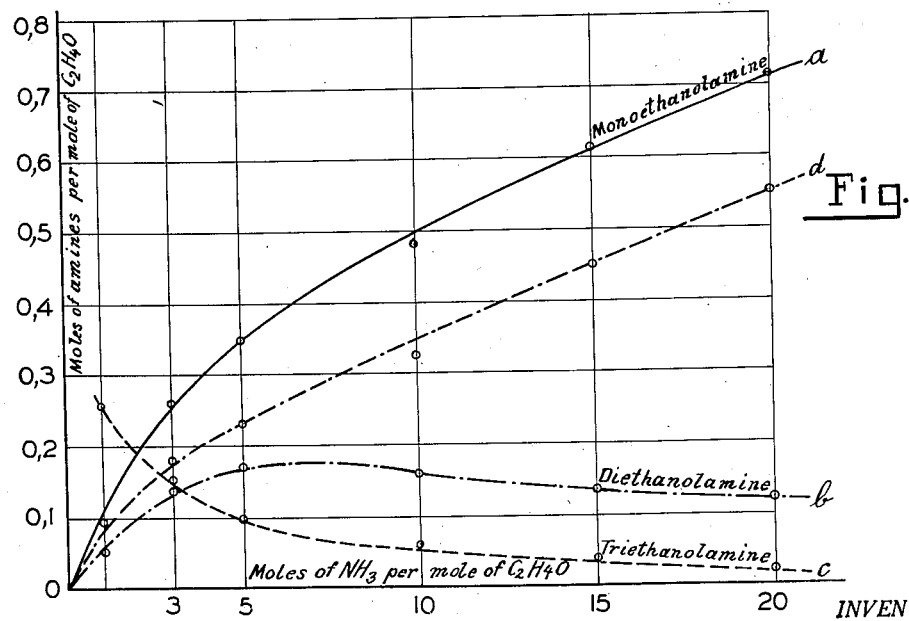

By referring to the law of mass action, it may be accepted as a priori that the addition of di-ethanolamine to the ammonia/oxide reaction mixture would lead to a reduction of the amount of secondary amine formed and that one would succeed in completely suppressing its formation by adding a predetermined quantity of di-ethanolamine, equal to that which is normally formed at the equilibrium for fixed conditions of excess of ammonia, say, 0.14 mole di-ethanolamine for an NH₃/oxide molecular ratio of 3:1, 0.17 mole di-ethanolamine for a 5:1 ratio and 0.16 mole di-ethanolamine for a 10:1 ratio; the quantities being given per mole of oxide used, as is clearly shown in Figure 2 (curve b) of the accompanying drawing. Now our investigations have shown that the addition of such quantities of di-ethanolamine does not produce the anticipated result; actually, there remain respectively 8, 9 and 17 gms. of di-ethanolamine per 100 gms. of amines formed under the operational conditions referred to above. Similar findings are obtained when using propylene oxide or higher olefine oxides.

According to the present invention, in order to reduce or suppress the production of secondary amine, there is added to the reactants being used, a quantity of this amine which is greater than the quantity which is formed at equilibrium under the conditions which have been considered.

We have actually found that, in order to suppress, for example, any formation of di-ethanolamine, there must be added beforehand to the reactive mixture, a quantity of di-ethanolamine which is proportional, not to the quantity corresponding to equilibrium, but surprisingly to the quantity of mono-ethanolamine which is formed at equilibrium. Thus, it is only by using respectively 0.18, 0.23 and 0.33 mole di-ethanolamine for the NH₃/oxide ratios of 3:1, 5:1 and 10:1 (curve $d$ of Figure 2), that all the oxide introduced is converted only into mono- and tri-ethanolamine, the added secondary amine being recovered at the end of the operation.

Contrary to what may be assumed, the curves of Figure 2 show that, as a function of the molecular ratio of ammonia/ethylene oxide that is employed, the quantity of di-ethanolamine necessary to suppress its formation (curve $d$) increases continuously, although the quantity of di-ethanolamine which is formed at equilibrium (curve $b$) commences by increasing, passes through a maximum and finally regularly decreases. By using quantities of di-ethanolamine less than those hereinbefore mentioned, the oxide is converted into a mixture of three amines, the proportion of secondary amine being less than that at the equilibrium shown in Figure 1.

By using quantities of di-ethanolamine greater than those hereinbefore mentioned, the oxide is similarly converted into only mono- and tri-ethanolamine; moreover, in this case, a part of the added di-ethanolamine is also converted into triethanolamine.

Thus, for example, starting with ethylene oxide and ammonia in aqueous solution, the present invention provides a process for the preparation of a mixture of the three corresponding amines and a process in which the quantity of diethanolamine formed is reduced as desired, or even suppressed, by adding beforehand the requisite quantity of diethanolamine to the reactants being used, such quantity being proportional to that of the mono-ethanolamine which is formed under the conditions that have been considered.

We have shown experimentally that the factor of proportionality between the mean concentration of di-ethanolamine which it is necessary to have present, by prior addition of this amine, in order to suppress its formation, and the mean concentration of mono-ethanolamine, is the ratio of the constants of the speed of reaction of ethylene oxide on mono-ethanolamine on the one hand, and on di-ethanolamine on the other hand.

Another way of carrying out the present invention consists in initially adding an excess of di-ethanolamine as compared with the quantity which corresponds to the suppression of its formation so as to convert this excess into tri-ethanolamine, the final mixture of amines which is formed comprising only the mono- and the tri-ethanolamine.

Example 1

On the one hand, 44 parts (by weight) of ethylene oxide and, on the other hand, 235 parts of ammoniacal solution having a density of 0.92, to which are added 19 parts of diethanolamine, are continuously introduced, per hour, into the reaction apparatus maintained at 15° C. The product of the reaction is continuously drawn off. After eliminating the excess ammonia and the water, the composition of ethanolamines formed, when the di-ethanolamine used is abstracted, is 30 parts of mono-ethanolamine per 70 parts of tri-ethanolamine.

Example 2

On the one hand, 44 parts of ethylene oxide and, on the other hand, 390 parts of ammoniacal solution having a density of 0.92 to which are added 24 parts of di-ethanolamine, are continuously introduced, per hour, into the reaction apparatus maintained at 15° C.

The product of the reaction is continuously drawn off. After eliminating the excess ammonia and the water, the composition of ethanolamines formed, when the di-ethanolamine used is abstracted, is 40 parts mono-ethanolamine per 60 parts tri-ethanolamine.

Example 3

On the one hand, 44 parts of ethylene oxide and, on the other hand, 780 parts of ammoniacal solution having a density of 0.92 to which are added 35 parts of di-ethanolamine, are continuously introduced, per hour, into the reaction apparatus maintained at 15° C. The product of the reaction is continuously drawn off. After elimination of the excess ammonia and the water, the composition of ethanolamines formed, when the diethanolamine used is abstracted, is 50 parts monoethanolamine per 50 parts tri-ethanolamine.

Example 4

On the one hand, 44 parts of ethylene oxide and, on the other hand, 390 parts of ammoniacal solution of density 0.92 to which is added 30 parts di-ethanolamine, are continuously introduced, per hour, into the reaction apparatus maintained at 15° C. The product of the reaction is continuously drawn off. After eliminating the excess ammonia and the water, the composition of the ethanolamines formed, is 37 parts mono-ethanolamine and 63 parts tri-ethanolamine. In this case, not all of the di-ethanolamine added is recovered, a part thereof being transformed into tri-ethanolamine, which explains why there is obtained here less mono-ethanolamine and more tri-ethanolamine than in Example 2.

Example 5

On the one hand, 44 parts of ethylene oxide and, on the other hand, 390 parts of ammoniacal solution having a density of 0.92, to which are added 20 parts di-ethanolamine, are continuously introduced, per hour, into the reaction apparatus maintained at 15° C. The product of the reaction is continuously drawn off. After eliminating the excess ammonia and the water, the composition of ethanolamines formed, when the di-ethanolamine used is abstracted, is of 40 parts mono-, 6 parts di- and 54 parts tri-ethanolamine.

These examples clearly illustrate the advantages of the process in accordance with the present invention.

The process according to this invention offers a remarkable flexibility in working: in effect, it makes possible the preparation of ethanolamines:

(1) Without formation of di-ethanolamine, with the production of variable proportions of mono- and tri-ethanolamine as a function of the molecular ratio of ammonia/oxide that is used: with a ratio 3:1:30% mono- and 70% tri-ethanolamine; 5:1:40% mono- and 60% tri-ethanolamine; 10:1:50% mono- and 50% tri-ethanolamine; 15:1:65% mono- and 35% tri-ethanolamine.

(2) With a consumption of di-ethanolamine, by adding a quantity of di-ethanolamine in excess as compared with that which suppresses its formation, this excess being converted during the carrying out of the process into tri-ethanolamine.

(3) With a formation of di-ethanolamine, by determining the quantity of di-ethanolamine to be added as a function of the quantity of this amine which it is desired to produce.

It is a remarkable fact that the quantity of mono-ethanolamine formed always remains that which corresponds to equilibrium as a function of the molar ratio of ammonia/oxide, whether working with or without additions beforehand of di-ethanolamine.

These advantages are associated with a particularly simple process, since it is operated in aqueous solution at normal pressure, without making use of outside reactions whilst obtaining directly acceptable concentrations of amines.

Obviously, the invention is not limited to the foregoing examples: it is applicable whatever may be the molar ratio of ammonia/oxide and the concentration of the ammonia in the solution, and whether operated at the temperature indicated or at lower or higher temperatures, at atmospheric pressure or at greater pressures, in a continuous or discontinuous process.

The various embodiments described with reference to the foregoing examples are likewise applicable, within the scope of the invention, to the use of propylene oxide or higher olefine oxides with a view to reducing or suppressing the formation of the secondary amine. By higher olefine oxides are to be understood, in the present specification, the oxides of olefines capable of reacting with ammonia.

We claim:

1. In the production of alkanolamines by the reaction of a low molecular alkylene oxide and aqueous ammonia in any specific molar ratio and under any specific reaction condition, wherein the proportions of mono-, di-, and tri-alkanolamines produced are dependent upon the molar ratios of the reactants and the reaction conditions used, the improvement which comprises reacting the low molecular alkylene oxide and the aqueous ammonia in the presence of an addition of a quantity of the di-alkanolamine produced by said reaction in excess of the molar amount which would be produced by reaction between said reactants under said specific molar ratio and reaction conditions when no such addition is made.

2. In the production of alkanolamines by the reaction of a low molecular alkylene oxide and aqueous ammonia in a molar ratio of ammonia to alkylene oxide varying between 3:1 and 20:1 and under any specific reaction condition, wherein mono-, di-, and tri-alkanolamines are normally produced in proportions dependent upon the molar ratios of the reactants and the reaction conditions used, the improvement which comprises reacting the low molecular alkylene oxide and the aqueous ammonia in the presence of an addition of a quantity of the di-alkanolamine produced by said reaction in excess of the molar amount which would be produced by reaction between said reactants under said specific molar ratio and reaction conditions when no such addition is made which causes the formation of substantially only mono-alkanolamine and tri-alkanolamine under said specific molar ratio and reaction conditions.

3. In the production of ethanolamine by the reaction of ethylene oxide and aqueous ammonia in any specific molar ratio and under any specific reaction condition, wherein the proportions of mono-, di-, and tri-ethanolamines produced are dependent upon the molar ratios of the reactants and the reaction conditions used, the improvement which comprises reacting ethylene oxide and the aqueous ammonia in the presence of an addition of a quantity of di-ethanolamine in excess of the molar amount which would be produced by reaction between said reactants under said specific molar ratio and reaction conditions when no such addition is made.

4. In the production of ethanolamines by the reaction of ethylene oxide and aqueous ammonia in a molar ratio of ammonia to ethylene oxide varying between 3:1 and 20:1 and under any specific reaction condition, wherein mono-, di-, and tri-ethanolamines are normally produced in proportions dependent upon the molar ratios of the reactants and the reaction conditions used, the improvement which comprises reacting ethylene oxide and the aqueous ammonia in the presence of an addition of a quantity of di-ethanolamine in excess of the molar amount which would be produced by reaction between said reactants under said specific molar ratio and reaction conditions when no such addition is made which causes the formation of substantially only mono-ethanolamine and tri-ethanolamine under said specific molar ratio and reaction conditions.

5. In the production of ethanolamines by the reaction of ethylene oxide and ammonia in varying molar ratios in aqueous solution as represented by Figure 2 of the appended drawing, the improvement which comprises adding to said reactants diethanolamine in excess of a molar amount represented by curve $b$ in said figure.

6. In the production of ethanolamine by the reaction of ethylene oxide and ammonia in varying molar ratios in an aqueous solution as represented by Figure 2 of the appended drawing, the improvement which comprises adding to said reactants diethanolamine in an amount at least approximately equaling the molar amount represented by curve $d$ in said figure.

PAUL FERRERO.
FRANÇOIS BERBÉ.
LÉON RENÉ FLAMME.

REFERENCES CITED

The following references are of record in the file of this patent:

UNITED STATES PATENTS

| Number | Name | Date |
|---|---|---|
| Re. 19,632 | Arnold | July 9, 1935 |
| 1,904,013 | Reid | Apr. 18, 1933 |
| 1,988,225 | Wickert | Jan. 15, 1935 |
| 2,051,486 | Kautter | Apr. 18, 1936 |
| 2,085,785 | Bottoms | July 6, 1937 |
| 2,092,431 | Swallen et al. | Sept. 7, 1937 |
| 2,373,199 | Schwolgler et al. | Apr. 10, 1945 |

FOREIGN PATENTS

| Number | Country | Date |
|---|---|---|
| 497,093 | Great Britain | Dec. 13, 1938 |

OTHER REFERENCES

G. D. Parkes et al.: "Mellor's Modern Inorganic Chemistry," (Longmans, Green and Co., 1946), pp. 213–217.

W. F. Ehret: "Smith's College Chemistry," (D. Appleton Century Co., 6th ed., 1946), pp. 232 and 236.